United States Patent
Joege et al.

(10) Patent No.: US 11,918,965 B2
(45) Date of Patent: Mar. 5, 2024

(54) PRODUCTION SYSTEM FOR PRODUCING FORMULATIONS

(71) Applicant: BASF COATINGS GMBH, Münster (DE)

(72) Inventors: Frank Joege, Münster (DE); Bernhard Hueser, Münster (DE); Ralf Berg, Münster (DE); Stefan Groetsch, Münster (DE); Jeremy Fouillet, Münster (DE); Michael Kolbe, Münster (DE); Jan Berg, Münster (DE)

(73) Assignee: BASF COATINGS GMBH, Muenster (DE)

( * ) Notice: Subject to any disclaimer, the term of this patent is extended or adjusted under 35 U.S.C. 154(b) by 449 days.

(21) Appl. No.: 16/614,672

(22) PCT Filed: May 2, 2018

(86) PCT No.: PCT/EP2018/061157
§ 371 (c)(1),
(2) Date: Nov. 18, 2019

(87) PCT Pub. No.: WO2018/210562
PCT Pub. Date: Nov. 22, 2018

(65) Prior Publication Data
US 2020/0179887 A1    Jun. 11, 2020

(30) Foreign Application Priority Data
May 19, 2017   (EP) .................................. 17171952

(51) Int. Cl.
*B01F 35/82* (2022.01)
*B29B 7/72* (2006.01)
*G05D 11/13* (2006.01)

(52) U.S. Cl.
CPC .............. *B01F 35/82* (2022.01); *B29B 7/726* (2013.01); *G05D 11/136* (2013.01); *G05D 11/137* (2013.01); *G05D 11/138* (2013.01)

(58) Field of Classification Search
CPC ...... B01F 35/2202; B01F 23/405; C09D 7/80; B29B 7/244; B29B 7/28; G05D 11/136; G05D 11/137; G05D 11/138
(Continued)

(56) References Cited

U.S. PATENT DOCUMENTS 6,440,374 B1   8/2002  Jelinek et al.
6,533,449 B1 *  3/2003  Auad ................... B01F 35/834
                                                366/132

(Continued)

FOREIGN PATENT DOCUMENTS

CN    102549516 A    7/2012
CN    102947768 A    2/2013
(Continued)

OTHER PUBLICATIONS

English Translation of International Search Report for International Patent Application No. PCT/EP2018/061157, dated Jun. 25, 2018, 2 pages.

(Continued)

Primary Examiner — Marc C Howell
(74) Attorney, Agent, or Firm — Armstrong Teasdale LLP

(57) ABSTRACT

Described herein is a production system including a unit, wherein the unit includes a subunit (1.1) for continuous manufacture of formulations. The subunit includes a combination of a small-volume process mixer and a buffer tank, means of feeding defined amounts of feedstocks into the process mixer, a measurement unit for ascertaining properties of a formulation manufactured in the process mixer, an evaluation unit for determining a deviation of properties of (Continued)

the formulation manufactured in the process mixer from the properties of a predefined target state, and a unit for adjusting the feed of feedstocks in view of the deviations. Also described herein is a process for manufacturing formulations.

8 Claims, 1 Drawing Sheet

(58) Field of Classification Search
USPC .................................................. 366/152.3
See application file for complete search history.

(56) References Cited

U.S. PATENT DOCUMENTS

| | | | |
|---|---|---|---|
| 6,923,568 | B2 | 8/2005 | Wilmer et al. |
| 9,327,212 | B2 | 5/2016 | Blank et al. |
| 10,955,092 | B2 | 3/2021 | Andrei et al. |
| 2014/0195055 | A1 | 7/2014 | Wadhwa et al. |
| 2017/0348657 | A1* | 12/2017 | Mints ............... E21B 33/13 |

FOREIGN PATENT DOCUMENTS

| | | |
|---|---|---|
| CN | 104285192 A | 1/2015 |
| EP | 1749565 A1 | 2/2007 |
| JP | H06238143 A | 8/1994 |
| JP | 2002511963 A | 4/2002 |
| KR | 20030068124 A | 8/2003 |
| WO | 9948602 A1 | 9/1999 |
| WO | 2018210559 A1 | 11/2018 |
| WO | 2018210560 A1 | 11/2018 |
| WO | 2018211011 A1 | 11/2018 |

OTHER PUBLICATIONS

European Search Report for EP Patent Application No. 17171952.9, dated Sep. 11, 2017, 3 pages.

* cited by examiner

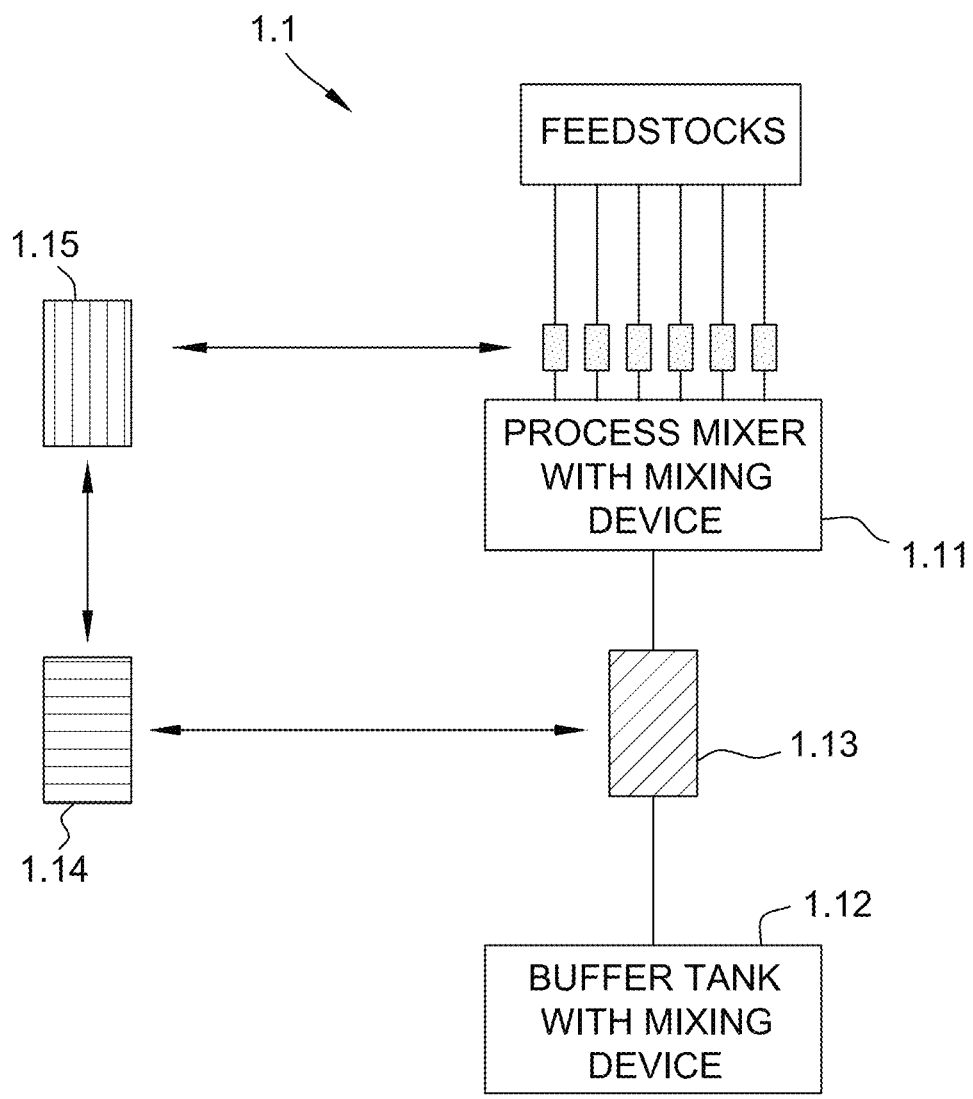

PRODUCTION SYSTEM FOR PRODUCING FORMULATIONS

CROSS-REFERENCE TO RELATED APPLICATIONS

This application is a U.S. National Phase Application of International Patent Application No. PCT/EP2018/061157, filed May 2, 2018, which claims the benefit of priority to EP Patent Application No. 17171952.9, filed May 19, 2017, the entire contents of which are hereby incorporated by reference herein.

FIELD OF THE INVENTION

The present invention relates to a novel production system for manufacture of formulations. The present invention additionally relates to a process for continuous manufacture of formulations, for example paints, which is preferably conducted using the production system.

BACKGROUND

Formulations, i.e. multicomponent systems of greater or lesser complexity, and the manufacture thereof are a central constituent in a wide variety of different branches of industry. Examples include the paints industry, the food and drink industry, or else the medical industry. Corresponding products (formulations) are manufactured by physical mixing of liquid (free-flowing) and solid materials (raw materials) and/or of intermediates manufactured from corresponding raw materials beforehand.

Production systems and corresponding processes for manufacture of formulations are common knowledge. They typically contain one or more mixing vessels (process mixers) in which the components of the material to be manufactured, after being weighed out, are mixed together.

The wide range of products (formulations) to be manufactured that exists in industrial production is frequently accompanied by a likewise enormous complexity of raw materials and intermediates to be used (also referred to collectively as feedstocks for production of products (formulations), where intermediates can also be referred to as a formulation, and so the term unless specified otherwise is considered to be an umbrella term for products and intermediates).

It is also important that many raw materials, such as resins, pigments and additives in particular, for example because some of the manufacturing processes therefor are complex, are not always supplied with completely constant properties and can then be used. The individual profiles of properties that then exist, in the case of use in the production of formulations, can lead to unforeseeable changes in the properties of the material produced. Thus, in general, a formulation is produced on the basis of documented recipe specifications. If the actual state of the material manufactured which is to be determined then differs too far from the desired and fundamentally expected target state, it is necessary to adjust the off-spec material.

An additional factor is that, even in modern production plants, the weighing or dosage of feedstocks is only possible with limited accuracy. Even slight changes, especially together with the above-described non-constant profiles of properties of feedstocks, can lead to deviations in the properties of the material manufactured. Corresponding adjustments to the material manufactured are thus unavoidable.

The prior art solves this problem generally by the determination of properties of the material manufactured (actual state), the determination of the deviations of the actual state from the target state, and subsequent addition of one or more feedstocks to material manufactured for establishment of the target state.

A disadvantage of this form of adjustment is firstly that an adjustment can be made only by the addition of feedstocks. Adjustment in an acceptable manner is thus possible only in one direction. If, for example, the viscosity of the material manufactured is too high, lowering of the viscosity is possible by the subsequent addition of solvents. Compensating for too low a viscosity by the addition of a multitude of resin components and additives, for example, in specific ratios is impracticable. The same is true when, for example, the hue of a material, for example an automotive paint, is to be adjusted. If too high an amount of the underlying pigment or of the corresponding color paste is present, adjustment via the addition of further components is extremely complex.

A further disadvantage is the fact that the entire manufacturing process comprising the actual batch manufacture and the only subsequent adjustment is very time-consuming.

BRIEF DESCRIPTION

The problem addressed by the present invention was that of providing a production system for manufacturing of formulations, which is able to overcome the above-described disadvantages and of improving the unavoidably necessary adjustment of material manufactured in the course of industrial production processes in terms of process technology and time. In this way, it should especially be possible to effectively manufacture color- and/or effect-imparting paints, for example automotive paints.

What has been found is a novel production system for manufacturing of formulations, comprising a unit (1) for the production of formulations, where the unit (1) comprises a subunit (1.1) for continuous manufacture of formulations, comprising I. at least one combination of a small-volume process mixer (kP) and a buffer tank, where the process mixer (kP) and the buffer tank contain mixing devices, II. at least one connection between the process mixer (kP) and the buffer tank for transfer of a formulation manufactured continuously in the process mixer (kP) from the process mixer (kP) to the buffer tank, III. means (M) of feeding defined amounts of feedstocks into the process mixer (kP), IV. at least one measurement unit for ascertaining properties of a formulation manufactured continuously in the process mixer (kP), V. at least one evaluation unit which is in communication with the measurement unit and is for determination of a deviation in the properties of a formulation manufactured continuously in the process mixer (kP) from the properties of a predefined target state, and VI. at least one unit which is in communication with the evaluation unit and is for adjusting the feed of feedstocks into the process mixer (kP), and which is set up to take account of the deviations in the properties of a continuously manufactured portion of a formulation from the properties of a predefined target state and use them to adjust the amounts of feedstocks fed in in the continuous manufacture of further portions.

What has also been found is a process for continuously manufacturing formulations, comprising continuously feeding feedstocks into a small-volume process mixer (kP) in which there is a mixing device for mixing of the feedstocks, continuously manufacturing a formulation by mixing the feedstocks in the process mixer (kP) and transferring the formulation into a buffer tank with a mixing device via a connection between the process mixer (kP) and the buffer tank, ascertaining properties of the continuously manufactured formulation by means of a measurement unit, determining a deviation of properties of the continuously manufactured formulation from the properties of a predefined target state by means of an evaluation unit, ascertaining the adjustment volumes for feedstocks that are needed in view of the deviations in the properties of the continuously manufactured formulation from the target state and the total volume of formulation volume to be manufactured for establishment of the target state of the total volume, continuously manufacturing further portions of the formulation in the process mixer, taking account of the adjustment volumes ascertained by adjusting the feed of feedstocks into the process mixer, combining the manufactured portions for manufacture of the total volume.

The production system of the invention and the process of the invention enable the above-described disadvantages of the prior art to be overcome and the necessary adjustment of formulations manufactured to be improved in terms of process technology and time.

BRIEF DESCRIPTION OF THE FIGURES

The FIGURE illustrates an embodiment of the production system of the disclosure.

DESCRIPTION

Production System

The production system of the invention comprises a unit (1) and/or a subunit (1.1).

According to the invention, the term "unit" or "subunit" describes the delimitable properties and individual functions of the respective unit or subunit. It is not necessary, for example, for two units or subunits to be spatially or physically clearly separated from one another and/or for one subunit to constitute a spatially and/or physically individualized region. For example, one subunit may have many different regions. These regions may each be directly alongside one another or one on top of another. Alternatively, they may equally be wholly or partly spatially separated from one another, in which case, for example, other regions, units or subunits of the production system are arranged in corresponding separation regions.

It is preferable that the subunit (1.1) is set up for continuous manufacture of liquid products (formulations). In addition, it is preferably suitable for manufacture of any form of intermediates, especially liquid intermediates. This applies both to intermediates manufactured from solid and liquid raw materials and to intermediates manufactured from liquid raw materials only. This equally applies to intermediates which are manufactured from intermediates manufactured beforehand or from intermediates manufactured beforehand and solid and/or liquid raw materials.

In this context, it is preferable that the subunit (1.1) is set up for manufacture of products and intermediates with exclusive use of liquid feedstocks and/or feedstocks that can be used as liquid feedstocks through pretreatment. A corresponding pretreatment can take place, for example, through shaking, stirring and/or tumbling, and also heating.

The person skilled in the art knows how the subunit (1.1) should be set up in this connection, and this is additionally also apparent from the description below (mixing devices for liquid feedstocks, fluid-conducting connections between process mixer and buffer tank, means (M) set up for feeding of defined amounts of liquid feedstocks).

In the context of the present invention, unless stated otherwise, the liquid (free-flowing) state relates in each case to a temperature of 20° C., standard pressure (1013.25 hPa) and a shear stress of 1000 s$^{-1}$ for one minute. If a component under these conditions has a viscosity of not more than 10 000 mPas (measured, for example, with the Rheomat RM 180 instrument from Mettler-Toledo), it is fundamentally referred to as liquid.

Feedstocks that can be used as liquid feedstocks through pretreatment should be understood as follows. It is of course possible, for example, to pretreat raw materials and intermediates which are to be used for production of products and which cannot be described as liquid under the fundamental conditions described above in such a way that they can be used as a liquid feedstock by the definition applicable here (viscosity of not more than 10 000 mPas).

Most preferably, the subunit (1.1) is set up for continuous manufacture of colored and/or effect-imparting liquid formulations with exclusive use of liquid feedstocks and/or feedstocks that can be used as liquid feedstocks through pretreatment.

Corresponding formulations are especially paints containing coloring and/or effect pigments, for example solid-colored basecoats or effect-imparting basecoats. Paints such as filler-surfacers which generally contain white and/or black pigments are also in principle to be included among the colored formulations. Useful feedstocks for manufacture of these formulations especially include color and/or effect pastes, and the intermediates (mixing varnishes) manufactured in a subunit (1.2) described further down. It is of course additionally possible to use liquid raw materials.

As shown in the FIGURE, the subunit (1.1) comprises one or more combinations of at least two different vessels, wherein the first vessel within such a combination is a small-volume process mixer (kP) (1.11) and the second vessel is a buffer tank (1.12) for mixtures discharged from the process mixer (kP) (1.11), preferably liquid mixtures. Mixing devices that are usable therein in principle, for example dissolvers, are known to those skilled in the art. The mixing devices assure mixing of feedstocks and hence the manufacture of liquid formulations in particular (process mixer), or the compositions manufactured can be kept in homogenized form for prevention of settling processes (buffer tank). The process mixer (1.11) and buffer tank (1.12) are connected to one another, such that mixtures manufactured in the process mixer (1.11), for example intermediates or products, can be transferred into the buffer tank (1.12) in a controlled manner. This is technically possible without any problem via corresponding pipework, preferably fluid-conducting pipework, and intermediate connection of conveying means such as pumps and valves.

The unit (1.1) thus first comprises a small-volume process mixer (kP) (1.11), including mixing device. The mixing devices are preferably inline dissolvers, static mixers, or mixers working by the rotor-stator principle. The term "small-volume" relates here to a significantly smaller capacity in relation to process mixers used on the industrial production scale (with a capacity usually of several tonnes).

The process mixer (1.11) has, for example, a capacity of 0.1 to 100 liters, for example 0.5 to 50 liters or else 1 to 20 liters, especially 1 to 10 liters, for example 5 liters. The process mixer (1.11) is preferably set up such that the mixing device is arranged between the inlets for feeding of feedstocks and the at least one outlet for removal of formulations manufactured. The feedstocks flowing into the process mixer (kP) (1.11) must thus pass through the mixing device before they exit from the process mixer (1.11). The small mixing volume defined by the small size of the process mixer (1.11) and correspondingly high energy inputs through the mixing device enable efficient mixing of the feedstocks within the context of continuous manufacture of formulations. "Continuous manufacture" is understood to mean that the feedstocks for manufacture flow into the process mixer (kP) (1.11) in continuous, specifically adjustable mass flows and the feedstocks, in the form of a mixture after passing through the mixing device, i.e. as a formulation, then leave the process mixer (1.11) again via the outlet(s) in a likewise continuous mass flow. Typical outputs of the mixing devices, for example of a mixer working by the rotor-stator principle, are in the range from 1 to 250 kW, especially 5 to 200 kW, preferably 25 to 150 kW, more preferably 50 to 125 kW or else 85 to 95 kW, where the person skilled in the art is able to adjust the output without any problem to the other characteristics of the process mixer (kP) (1.11), for example the capacity (low capacities correspond to comparatively lower outputs). The rotation speeds may vary according to the design, where typical rotation speeds may be between 1000-10 000 rpm, especially 2000-6000 rpm or else 3000-4000 rpm. Preferably, the process mixer (1.11) is completely filled and hence free of air during the production, such that production is possible without formation of foam.

The feeding of defined amounts of feedstocks into the process mixer (kP) (1.11) via the means (M) is effected in a manner known in principle to the person skilled in the art in this context.

For instance, transfer or withdrawal from corresponding reservoirs of feedstocks, for example tanks and other charge units known in this respect, is possible with incorporation of technical means of monitoring and closed-loop control of a mass flow of the particular feedstock.

For this purpose, the means (M) may comprise weighing units (for example weighing cells) and/or mass flow meters which can monitor and also regulate and adjust the flow, as a result of which it is firstly possible to withdraw defined amounts from reservoirs of feedstocks.

In connection with liquid feedstocks, which are preferred, the dimensions of the particular mass flow meter here are dependent on the flows and the viscosity of the feedstocks. The flow (mass flow) is regulated, for example, by means of commonly available conveying means, for example pumps, the conveying output of which can be adjusted within a wide range, and/or a regulating valve which can affect the conveying output via the throttling of the flow cross section. The exact location of the individual elements, for example the regulating valves, in the overall construction can be adapted to the individual case. They may, for example, be in the direct proximity of the conveying means, or else in the direct proximity of collecting lines as mentioned further down. They can even be within a collecting line. The metering accuracy of known systems is at least 1%, based on the addition value. It is also possible to limit the metering rate to a target value.

In connection with solid feedstocks, which can likewise be used in principle, the mass flow can be regulated via the vibration of a cone and/or the driving of a screw. A vibration unit or the like (if needed to promote solid flow properties) may also be present. The metering accuracy of known systems is at least 2%, based on the addition value. It is also possible to limit the metering rate, for example, to one kilogram per second. In this case, the means (M) thus in any case include means of determining a withdrawal volume (especially weighing cells). In addition, they include control means for the actual withdrawal mechanisms (i.e., for example, cones or screws). The control means would then be configured via an electronic control unit in particular, which takes account of the information ascertained by the weighing cells to control the withdrawal mechanism and correspondingly regulates and adjusts the withdrawal process with respect to the requirements.

Corresponding requirements for adjustment of the mass flow and hence the amounts of feedstocks fed in per unit time or overall can be obtained under electronic control via recipe specifications.

The means (M) are additionally set up for the actual feeding of the defined amounts of feedstocks into the process mixer (1.11). For this purpose, the means (M) include, for example, pipework systems, especially fluid-conducting pipework systems, which transfer the defined amounts into the process mixer (1.11).

The feedstocks are preferably fed in as follows.

First of all, intermediates manufactured in the subunit (1.2) described below, especially clear intermediates, are fed in as main flows, especially via fluid-conducting pipework with optional intermediate connection of mass flow meters that have already been described and conveying means such as pumps and additionally valves, directly from said subunit (1.2). Requirements for adjustment of the mass flow can be obtained under electronic control via recipe specifications.

In addition, color and/or effect pigments and functional fillers are preferably introduced using liquid intermediates manufactured beforehand, for example color and/or effect pastes. Feedstocks of this kind are lastly also supplied through corresponding fluid-conducting pipework which is to be included among the means (M). Corresponding requirements for adjustment of the mass flow and hence the amounts of feedstocks fed in per unit time or overall can be obtained under electronic control via recipe specifications.

The mass flow discharged from the process mixer (kP) is then transferred via fluid-conducting pipework into a buffer tank, including mixing devices for prevention of settling processes. The buffer tank has, for example, a capacity of 0.1 to 60 tonnes, for example 0.5 to 30 tonnes or else 1 to 15 tonnes or 2 to 5 tonnes, and is replenished continuously by the material discharged from the process mixer (kP). It is of course larger than the process mixer (kP) assigned thereto.

The advantage of the described plant design of combinations of process mixers (kP) and other tanks is that particularly effective and exact manufacture, adjustable within the process regime, of formulations and intermediates is possible in this way, irrespective of batch size.

For example, continuous production of a batch of the material to be manufactured by means of the process mixer (kP) (1.11) on the basis of recipe specifications, especially in the form of electronic documentation, is commenced. Depending on the properties of the material produced on commencement of batch production (actual state), the desired properties of the material to be manufactured overall (target state) and the size (mass, volume) of the batch, controlled adjustment of the feeding of feedstocks in the manufacture is possible. In this way, it is possible, for example, to compensate for variations in properties of the feedstocks used which, in the case of fixed mass flows, can lead to manufacture of material having an actual state deviating from the target state. The comparatively large capacity of the buffer tank (1.12), to be aligned to the individual case, additionally ensures that the size of the batch can still be subsequently adjusted. However, it should be pointed out that, in the context of the subunit (1.1) of the invention, because of the specific combination of different components, especially the measurement unit (1.13) described below, the evaluation unit (1.14) and the unit for adjustment (1.15) of the feeding of feedstocks, such subsequent adjustment of the batch size is generally unnecessary. Instead, the subunit can be used to produce a material in the target state in exactly the amount fixed beforehand. Further details in this regard are also described further down in the context of the process of the invention.

Accordingly, the subunit (1.1) additionally has a measurement unit (1.13) for ascertaining properties of a preferably liquid formulation or portion of said formulation manufactured in the process mixer (kP) (1.11). The measurement unit (1.13) may be assigned, for example, to the fluid-conducting pipework (connection) of the process mixer (kP) (1.11) and buffer tank (1.12). This means that it is possible by means of the pipework (or the corresponding connecting conduit systems) to branch off liquid material manufactured and ultimately transfer it to a measurement unit (1.13). The transfer to the measurement unit (1.13) may be automated or else manual. In the measurement unit (1.13), in an automated or manually induced manner, various properties of liquid material can then be detected, for example viscosity, pH, color, density, conductivity and temperature. It is also possible that the measurement unit (1.13) is arranged within the conduit system and that analysis takes place in an automated manner, for example by means of one or more sensors for detection of properties of the liquid material.

The subunit (1.1) likewise comprises an evaluation unit (1.14) which is in communication with the measurement unit (1.13) and is for determination of a deviation of properties of the material manufactured in the process mixer (1.11) (actual state) and the corresponding properties of a predefined target state. This evaluation too can be effected, for example, in an automated manner by comparison of electronically transmitted property data of the actual state with electronically documented data of the target state (comparison of actual state with reference values).

The unit (1.1) not least comprises a specific apparatus for adjustment (1.15) of the feeding of feedstocks into the process mixer (1.11).

The unit for adjusting the feeding of feedstocks (1.15) is connected to the evaluation unit (1.14), for example via an electronic information transfer unit, and so can communicate therewith.

If, for example, at the start of continuous batch production, the material manufactured has been analyzed with respect to relevant properties and these properties have been compared with a target state, it is possible to conduct the further continuous manufacture with adjustment of the feeding of feedstocks into the process mixer. It is advantageous here to regularly analyze the properties of the material produced at specific time intervals or continuously and compare them with the target state in order thus to enable iterative adjustment of the feeding of feedstocks. Ultimately, it is then possible to obtain a batch of on-spec material, i.e. material displaying the target state within acceptable error limits.

The ultimate aim is to take account of the deviations in the properties of a continuously manufactured portion of a formulation from the properties of a predefined target state and to use them to adjust the amounts of feedstocks fed in in the continuous manufacture of further portions.

This adjustment is possible in different ways, especially two different ways.

(i) For example, a disproportionate decrease or increase in the mass flow of one or more feedstocks compared to the target state is possible in order ultimately to obtain an on-spec material. This means that an adjustment of amounts of feedstocks fed in overall and/or per unit time to the process mixer is possible using the deviations between the actual state of a first portion of a formulation manufactured continuously and the target state which have been detected by means of the evaluation unit. If an excessively high proportion of a first feedstock has been used in the context of the manufacture of the first continuously manufactured portion, for example, the amount fed in is decreased disproportionately compared to the target state in the continuous manufacture of further material, in order to obtain an on-spec material overall. The inverse procedure is correspondingly employed in the case of excessively low proportions of feedstocks.

The disproportionate decrease and/or increase in the amounts of feedstocks fed in compared to the target state and hence compensation for an excessively large or excessively small amount of feedstocks used can be effected in different dosage profiles. For example, compensation can be effected continuously over the entire further production of the batch. Equally, the compensation can be effected in one or more adjustment intervals. For example, after the adjustment data (adjustment volumes) have been obtained, formulation material can be produced in the target state at first, in which case the compensation is only effected toward the end of the production of the batch. It is equally possible to make the compensation directly after the adjustment data (adjustment volumes) have been obtained, in which case formulation material is subsequently produced in the target state.

(ii) It should be noted, however, that the very small process mixer (kP) compared to the buffer tank means that, in spite of high flow rates, the material flow settings for obtaining the target state are generally obtained before, for example, 5 percent by mass of the batch volumes has been produced. In this case, the adjustment of the mass flow of one or more feedstocks to the target state can then be made in order ultimately to obtain an on-spec material. Thus, production is effected while keeping the settings to obtain the target state and the product is discharged into the buffer tank without conducting a disproportionate adjustment in the mass flows of feedstocks compared to the target state. A batch of on-spec material is then obtained, in which the material produced at the start is blended. Even though the target state is not obtained with such exactness as in the case of the adjustment (i) in this way, the specifications are met.

The adjustment of the feeding of feedstocks can be made with automated adjustment of the volumes of feedstocks taken from corresponding reservoirs via the means (M), and hence also adjustment of the feeding into the process mixer. As already described above, the basic amount of feedstocks fed in can be controlled via regulation of the mass flow. It is of course likewise possible to subject the mass flow of feedstocks to closed-loop control and adjust it in this way. This is then effected with utilization of the information obtained from the evaluation unit.

Transfer of information from the evaluation unit is preferably effected with involvement of electronic information transfer units.

The unit for adjustment of the feeding of feedstocks is accordingly preferably configured as an electronic control unit that processes electronically transmitted property data from the evaluation unit, optionally correlates it with further relevant input parameters, especially the total amount of formulation volume to be manufactured, ascertains correction volumes of feedstocks and then electronically induces an adjustment of the feeding of feedstocks. It is of course necessary for this purpose that the actual dosage mechanisms possessed by the technical means for closed-loop control and hence adjustment of the mass flow (means (M)) are electronically addressable via the electronic control unit.

It will be apparent from the above that the unit for adjustment of the feeding of feedstocks, with regard to the actual adjustment, is preferably adjusted such that, after the manufacture of the overall batch, this overall batch has the target state (i.e. is on-spec). What this means is that the corresponding correction volumes of feedstocks needed to establish the target state in the overall batch are ascertained in the unit for adjustment, before this then induces a corresponding adjustment in the feeding of feedstocks.

The overall batches of formulations manufactured in the subunit (1.1) can then be dispensed in a manner known per se. For this purpose, charge units, for example delivery packaging, can be kept ready at appropriate positions, which are filled from the buffer tank when required. The dispensing can then be effected via incorporation of typical devices such as dispensing heads with dispensing probes, for example in a dedicated dispensing unit of the production system which is provided for the purpose.

It follows from the above that the means (M) preferably include those means which have been set up for direct feeding of defined amounts of liquid intermediates from the subunit (1.2) described below, which have been manufactured in the subunit (1.2).

The unit (1) preferably comprises a further subunit (1.2) for manufacture of formulations and intermediates with use of liquid feedstocks and/or feedstocks that can be used as liquid feedstocks through pretreatment, comprising a. at least one combination of a process mixer and a buffer tank, where the process mixer and the buffer tank contain mixing devices,
b. at least one fluid-conducting connection between the process mixer and buffer tank for transfer of part-batches of formulations manufactured in the process mixer from the process mixer into the buffer tank,
c. means of feeding defined amounts of feedstocks into the process mixer,
d. at least one measurement unit for ascertaining properties of a part-batch of a formulation manufactured in the process mixer,
e. at least one evaluation unit which is in communication with the measurement unit and is for determination of a deviation of properties of part-batches manufactured in the process mixer from the properties of a predefined target state,
f. at least one unit which is in communication with the evaluation unit and is for adjusting the feed of defined amounts of feedstocks into the process mixer, and which is set up to take account of the deviations in the properties of a manufactured part-batch from the properties of a predefined target state and the number and size of further part-batches in order to adjust the amounts of feedstocks fed in in the manufacture of further part-batches.

It is preferable that the subunit (1.2) is set up for manufacture of liquid products (formulations). In addition, it is preferably suitable for manufacture of any form of intermediates, especially liquid intermediates. This applies both to intermediates manufactured from solid and liquid raw materials and to intermediates manufactured from liquid raw materials only. This equally applies to intermediates which are manufactured from intermediates manufactured beforehand or from intermediates manufactured beforehand and solid and/or liquid raw materials.

In this context, it is preferable that the subunit (1.2) is set up for manufacture of products and intermediates with exclusive use of liquid feedstocks and/or feedstocks that can be used as liquid feedstocks through pretreatment. A corresponding pretreatment can take place, for example, through shaking, stirring and/or tumbling, and also heating.

It is more preferred that, in the subunit (1.2), clear and white liquid formulations (products and intermediates) are manufactured, preferably exclusively clear and white liquid formulations. Very preferably, exclusively clear liquid formulations are manufactured. An example of a clear product is a clearcoat; an example of a clear intermediate is a mixing varnish which is to be used at a later stage for manufacture of products such as paints. An example of a white product is a solid-colored white basecoat.

The reason for this is that the plant design described in particular, with a combination of process mixer and buffer tank, can be cleaned quickly and efficiently without manual intervention by the CIP (cleaning in place) method which is known per se.

The subunit (1.2) comprises one or more combinations of at least two different vessels, wherein the first vessel within such a combination is a process mixer and the second vessel is a buffer tank for mixtures discharged from the process mixer, preferably liquid mixtures. Mixing devices that are to be used therein, for example dissolvers, are known to those skilled in the art. The mixing devices assure mixing of feedstocks and hence the manufacture of liquid formulations in particular (process mixer), or the compositions manufactured can be kept in homogenized form for prevention of settling processes (buffer tank). The process mixer and buffer tank are connected to one another, such that mixtures manufactured in the process mixer, for example intermediates or products, can be discharged into the buffer tank in a controlled manner. This is technically possible without any problem via corresponding pipework, preferably fluid-conducting pipework, and intermediate connection of conveying means such as pumps and valves. A further mixing device, for example an inline dissolver, may also be arranged within the connecting unit between the process mixer and buffer tank. This is advisable when the current contents in the process mixer are to be pumped in circulation in order to serve as a carrier stream for further feedstocks which are to be fed to the production process. In that case, the further mixing device can serve to mix this carrier stream.

It is preferable that, within a combination, the buffer tank has a greater capacity than the process mixer. More preferably, the buffer tank has at least twice the capacity compared to the process mixer, especially preferably at least three times the capacity. The process mixer here has, for example, a capacity of 0.1 to 60 tonnes, for example 0.5 to 30 tonnes or else 1 to 15 tonnes, or 2 to 5 tonnes.

The feeding of defined amounts of feedstocks into the process mixer, especially via the implementation of a specific mass flow, can especially be effected via means similar or equivalent to the above-described means (M). Corresponding requirements for adjustment of the mass flow and hence the amounts of feedstocks fed in per unit time or overall can be obtained under electronic control via recipe specifications.

The means of the subunit (1.2), in connection with liquid feedstocks which are preferred, especially include collecting lines. This means that the feedstocks taken from reservoirs are first transferred via fluid-conducting pipework systems known per se into one or more collecting lines, via which they are then fed to the process mixer.

The feedstocks can be fed in in an automated and electronically controlled manner in any sequence (sequentially, in parallel, partly in parallel), in order, for example, to feed feedstocks which react with one another and/or are incompatible when in pure form or in highly concentrated form to the process mixer separately from one another.

It is also possible in this connection that the current contents of the process mixer are pumped in circulation via the collecting line and serve as a carrier stream for further feedstocks.

The feedstocks fed into the process mixer are then mixed by means of the corresponding mixing devices.

The advantage of the described plant design of combinations of process mixers and buffer tanks is that particularly effective and exact manufacture, adjustable within the process regime, of formulations and intermediates is possible in this way.

If, for example, a first part-batch of a material to be manufactured in the process mixer has been manufactured on the basis of recipe specifications, especially in electronically documented form, this can be transferred to the buffer tank. Depending on the properties of the first part-batch (actual state), the desired properties of the material to be manufactured overall (target state) and the number of part-batches to be manufactured overall and/or the size (mass, volume) of further part-batches, controlled adjustment of the feeding of feedstocks in the manufacture of one or more further part-batches is possible. In this way, it is especially possible to compensate for the variations in properties, as described at the outset, of the feedstocks used, which, in the case of fixed use volumes, can lead to manufacture of a first part-batch having an actual state deviating from the target state. Further details in this regard are also described further down in the context of the process.

Accordingly, the subunit (1.2) additionally has a measurement unit for ascertaining properties of a preferably liquid formulation or of a first part-batch of said formulation manufactured in the process mixer. The measurement unit may be assigned, for example, to the preferably fluid-conducting pipework (connection) of the process mixer and buffer tank. This means that it is possible by means of the pipework (or the corresponding connecting conduit systems) to branch off liquid material manufactured and ultimately transfer it to a measurement unit. The transfer to the measurement unit may be automated or else manual. In the measurement unit, in an automated or manually induced manner, various properties of liquid material can then be detected, for example viscosity, pH, conductivity, density, temperature. It is also possible that the measurement unit is arranged within the conduit system and that analysis takes place in an automated manner, for example by means of one or more sensors for detection of properties of the liquid material.

The subunit (1.2) likewise comprises an evaluation unit which is in communication with the measurement unit and is for determination of a deviation of properties of the material manufactured in the process mixer (actual state) and the corresponding properties of a predefined target state. This evaluation too, for example, can be automated (comparison of actual state with reference values).

The unit (1.2) not least comprises a specific apparatus for adjustment of the feeding of feedstocks into the process mixer.

The unit for adjusting the feeding of feedstocks is connected to the evaluation unit, for example via an electronic information transfer unit, and so can communicate therewith.

If a first manufactured part-batch has been analyzed with regard to relevant properties, these properties have been compared with a target state and the part-batch has been transferred into the buffer tank, the manufacture of one or more further part-batches can be conducted with adjustment of the feeding of feedstocks into the process mixer. Ultimately, it is then possible to obtain an on-spec material, i.e. a material displaying the target state within acceptable error limits.

For example, the deviations between the actual state of the first part-batch and the target state that have been detected by means of the evaluation unit can be used to make an adjustment in amounts of feedstocks fed in overall and/or per unit time to the process mixer in one or more further part-batches. If an excessively high proportion of a first feedstock has been used in the context of the manufacture of the first part-batch, for example, the amount fed in is decreased disproportionately compared to the target state in one or more further part-batches, in order to obtain an on-spec material overall. The inverse procedure is correspondingly employed in the case of excessively low proportions of feedstocks.

The adjustment of the feeding of feedstocks can be made with automated adjustment of the amounts of feedstocks taken from corresponding reservoirs via the means (M), and hence also adjustment of the feeding into the process mixer. As already described above, the basic amount of feedstocks fed in can be controlled via regulation of the mass flow. It is of course likewise possible to subject the mass flow of feedstocks to closed-loop control and adjust it in this way. This is then effected with utilization of the information obtained from the evaluation unit.

The adjustment of the mass flows and the configuration of the unit for adjustment of the feeding of feedstocks as electronic control unit are possible in the manner described for subunit (1.1).

It will be apparent from the above that the unit for adjustment of the feeding of feedstocks, with regard to the actual adjustment, is preferably adjusted such that, after the manufacture of all part-batches (i.e. the overall batch), the overall batch has the target state (i.e. is on-spec). What this means is that the corresponding correction volumes of feedstocks needed to establish the target state in the overall batch are ascertained in the unit for adjustment, before this then induces a corresponding adjustment in the feeding of feedstocks.

The overall batches of formulations manufactured in the subunit (1.2) can then be dispensed in a manner known per se. For this purpose, charge units, for example delivery packaging, can be kept ready at appropriate positions, which are filled from the buffer tank when required. The dispensing can then be effected via incorporation of typical devices such as dispensing heads with dispensing probes, for example in a dedicated dispensing unit of the production system which is provided for the purpose.

Preferably, the subunit (1.2) additionally has an onward conduction unit for onward conduction of formulations manufactured, namely intermediates, to the subunit (1.1) of the invention. In this way, it is possible to use the respective intermediate in the subunit (1.1) for further production in a very process-efficient manner and without intermediate dispensing or redispensing.

Process

The present invention also relates to a process for manufacturing formulations. It is self-evidently preferable that the process is effected using the production system of the invention.

Central features and executions of the process have already been described above in the description of the production system. It is additionally the case that the above-described particular executions and features with regard to the production system are also applicable with regard to the process of the invention. This is especially true in connection with the preference for liquid feedstocks and feedstocks that are liquid through pretreatment and for colored and/or effect-imparting liquid formulations to be manufactured.

In principle, the process comprises the following steps:
continuously feeding feedstocks into a small-volume process mixer (kP) in which there is a mixing device for mixing of the feedstocks,
continuously manufacturing a formulation by mixing the feedstocks in the process mixer (kP) and transferring the formulation into a buffer tank with a mixing device via a connection between the process mixer (kP) and the buffer tank,
ascertaining properties of the continuously manufactured formulation by means of a measurement unit,
determining a deviation of properties of the continuously manufactured formulation from the properties of a predefined target state by means of an evaluation unit,
ascertaining the adjustment volumes for feedstocks that are needed in view of the deviations in the properties of the continuously manufactured formulation from the target state and the total volume of formulation volume to be manufactured for establishment of the target state of the total volume,
continuously manufacturing further portions of the formulation in the process mixer, taking account of the adjustment volumes ascertained by adjusting the feed of feedstocks into the process mixer,
combining the manufactured portions for manufacture of the total volume.

It is self-evident that the adjustment volumes in the above sense can be either positive or negative. A positive adjustment volume means that a higher proportion of the particular feedstock has to be used in total in order to achieve the target state with the formulation volume to be manufactured overall. This can be effected via a higher proportion of the feedstock in continuous further production and/or via lower proportions of other feedstocks in continuous further production. The situation is correspondingly reversed with negative correction volumes.

Preferably, the continuous feeding of defined amounts of feedstocks into the process mixer (kP) at least comprises the direct feeding of intermediates which have been manufactured in the preferably existing subunit (1.2). The feedstocks are thus fed in directly from the subunit (1.2).

It is possible, in the context of the process of the invention, to stop the continuous manufacture of a formulation by mixing of the feedstocks in the process mixer (kP) and transfer of the formulation into a buffer tank with a mixing device via a fluid-conducting connection between the process mixer (kP) and buffer tank for a specific period of time. This is an option when the measurement and/or evaluation of properties and/or deviations between the actual state and target state takes a comparatively long time. If the continuous manufacture is then stopped until measurement and evaluation are complete and hence adjustment of the feeding of feedstocks into the process mixer is possible, it is subsequently possible to continue production. This is an option especially when the plan is to proceed via the above-described adjustment method (ii).

It is preferable that, in a final step, the overall batch manufactured is dispensed into corresponding delivery packaging and then, for example, is transferred to a warehouse for long-term storage or delivered directly to a customer.

In connection with the subunit (1.2) which is preferably (but not necessarily) present, the process of the invention preferably additionally comprises the following steps:
feeding defined amounts of feedstocks into a process mixer in which there is a mixing device for dispersion and mixing of feedstocks,
manufacturing a part-batch of a formulation by mixing the feedstocks in the process mixer,
transferring the part-batch into a buffer tank with mixing device via a connection between process mixer and buffer tank,
ascertaining properties of the part-batch before, during or after transfer into the buffer tank by means of a measurement unit,
determining a deviation of properties of the part-batch from the properties of a predefined target state by means of an evaluation unit,
ascertaining the correction volumes for feedstocks that are needed in view of the deviations in the properties of the part-batch manufactured from the target state and the number and size of further part-batches for establishment of the target state of the overall batch,
manufacturing at least one further part-batch in the process mixer, taking account of the correction volumes ascertained in the manufacture of at least one of the further part-batches by adjustment of the feeding of feedstocks into the process mixer,
transferring the at least one further part-batch into the buffer tank,
combining the at least one further part-batch with the first part-batch and mixing all part-batches to manufacture the overall batch.

It is self-evident that the correction volumes in the above sense can be either positive or negative. A positive correction volume means that a higher proportion of the particular feedstock has to be used in total in order to achieve the target state. This can be effected via a higher proportion of the feedstock in the production of at least one further part-batch and/or via smaller proportions of other feedstocks in the production of at least one further part-batch. The situation is correspondingly reversed with negative correction volumes.

It has been found that the procedure in connection with non-automated measurement of properties in the measurement unit can advantageously be as follows. A total of three part-batches are manufactured, the first part-batch and the second part-batch being produced in the same way. During the production of the second part-batch, properties of the first part-batch are measured and evaluated with regard to deviations from the target state. In addition, the correction volumes are ascertained. The third part-batch is then produced taking account of the correction volumes. In this way, there remains sufficient time in which the material from the first part-batch can be analyzed. Should the measurement of properties of the first part-batch take longer, the principle can of course be extended. In that case, for example, 4 part-batches are manufactured, in which case the fourth part-batch is produced taking account of the correction volumes.

It is of course possible that, in the process, in a further step, the overall batch manufactured is dispensed into corresponding delivery packaging and then, for example, is transferred to a warehouse for long-term storage or delivered directly to a customer. This is preferred in the case of the manufacture of products, for example clearcoats or complete components of paints, for example base varnish and hardener for a two-component paint. In the case of manufacture of intermediates, it is preferable that the process, in a final step, comprises the transfer of the intermediates to the subunit (1.1) which is essential to the invention.

The production system of the invention and the process of the invention ensure that enormously process-efficient and time-saving manufacture of formulations, including an adjustment process, is enabled.

The invention claimed is:

1. A process for continuously manufacturing formulations, the process comprising:
   continuously feeding feedstocks into a process mixer (kP) in which there is a first mixing device for mixing of the feedstocks,
   continuously manufacturing a formulation by mixing the feedstocks in the process mixer (kP) and transferring the formulation into a buffer tank with a second mixing device via a connection between the process mixer (kP) and the buffer tank,
   ascertaining properties of the continuously manufactured formulation by means of a measurement unit, the measurement unit being assigned to the connection of process mixer and buffer tank or arranged within a corresponding conduit system,
   determining a deviation of properties from a predetermined desired state in a predictive state of the overall batch of the formulation based on the properties of the continuously manufactured formulation by means of an evaluation unit,
   ascertaining adjustment volumes for feedstocks that are needed in view of the deviations in the properties of the continuously manufactured formulation from the target state of the overall batch and a total volume of formulation volume to be manufactured for establishment of a target state of the total volume,
   continuously manufacturing further portions of the formulation in the process mixer (kP), taking account of the adjustment volumes ascertained by adjusting the feed of feedstocks into the process mixer (kP), and
   combining the manufactured portions for manufacture of the total volume.

2. The process as claimed in claim 1, wherein the formulations are manufactured using liquid feedstocks and feedstocks that can be used as liquid feedstocks through pretreatment.

3. The process as claimed in claim 2, wherein the formulations are manufactured with exclusive use of liquid feedstocks and feedstocks that can be used as liquid feedstocks through pretreatment.

4. The process as claimed in claim 1, wherein the continuous feeding of feedstocks is effected using means (M), where the means (M) have devices for withdrawing defined amounts of feedstocks from reservoirs that incorporate technical means of monitoring and closed-loop control of a mass flow rate of the respective feedstocks.

5. The process as claimed in claim 4, wherein the means (M) additionally comprise fluid-conducting pipework systems for transfer of the defined amounts of feedstocks into the process mixer.

6. The process as claimed in claim 1, wherein the properties that are ascertained in the measurement unit include viscosity, pH, color, conductivity, density, and/or temperature.

7. The process as claimed in claim 1, wherein the adjustment of the feeding of feedstocks is set up such that, after the manufacture of an overall batch, the overall batch has a target state predefined by reference values.

8. The process as claimed in claim 1, wherein the continuous feeding of defined amounts of feedstocks into the process mixer (kP) comprises the direct feeding of intermediates which have been manufactured in a subunit.

\* \* \* \* \*